US008046579B2

(12) United States Patent
Kresina

(10) Patent No.: US 8,046,579 B2
(45) Date of Patent: Oct. 25, 2011

(54) SECURE GATEWAY WITH REDUNDENT SERVERS

(75) Inventor: Roman Kresina, Oxford, CT (US)

(73) Assignee: Neopost Technologies, Bagneux (FR)

( * ) Notice: Subject to any disclaimer, the term of this patent is extended or adjusted under 35 U.S.C. 154(b) by 1623 days.

(21) Appl. No.: 11/242,964

(22) Filed: Oct. 4, 2005

(65) Prior Publication Data

US 2007/0079115 A1 Apr. 5, 2007

(51) Int. Cl.
*H04L 29/06* (2006.01)

(52) U.S. Cl. ........ 713/155; 713/156; 713/157; 380/279; 380/282

(58) Field of Classification Search .......... 713/155–157, 713/168, 175–177, 277–278; 380/273, 258, 380/279, 282; 705/67, 50, 60–61
See application file for complete search history.

(56) References Cited

U.S. PATENT DOCUMENTS

| | | | | |
|---|---|---|---|---|
| 6,233,565 | B1 * | 5/2001 | Lewis et al. ................. | 705/35 |
| 7,433,847 | B2 * | 10/2008 | Pauly ............................ | 705/60 |
| 7,461,250 | B1 * | 12/2008 | Duane et al. .................. | 713/157 |
| 7,496,200 | B2 * | 2/2009 | Multerer et al. .............. | 380/251 |
| 2002/0038420 | A1 * | 3/2002 | Collins et al. ................. | 713/156 |
| 2002/0147905 | A1 * | 10/2002 | Perlman ........................ | 713/157 |
| 2002/0178354 | A1 | 11/2002 | Ogg et al. | |
| 2003/0110376 | A1 * | 6/2003 | Wiener et al. ................ | 713/158 |
| 2003/0163687 | A1 * | 8/2003 | Dare et al. .................... | 713/157 |
| 2003/0237004 | A1 | 12/2003 | Okamura | |
| 2004/0148505 | A1 * | 7/2004 | Qiu ............................... | 713/175 |
| 2004/0151323 | A1 | 8/2004 | Olkin et al. | |
| 2005/0165703 | A1 * | 7/2005 | Kummer et al. .............. | 705/402 |
| 2006/0015500 | A1 * | 1/2006 | Heiden ........................... | 707/9 |
| 2006/0064590 | A1 * | 3/2006 | Bleumer et al. ............. | 713/171 |
| 2006/0085633 | A1 * | 4/2006 | Balfanz et al. ................ | 713/155 |

* cited by examiner

*Primary Examiner* — Edward Zee
*Assistant Examiner* — Chi Nguy
(74) *Attorney, Agent, or Firm* — Morris & Kamlay LLP

(57) ABSTRACT

A secure gateway includes a TLS server for authenticating connecting devices, a connection manager for routing requests from the TLS server to service provider adapters, and a key management system for providing key management functions, wherein when a device provides a manufacturing certificate to one or more servers of the gateway, servers identify the device as authentic by validating that the manufacturing certificate provided is signed by the same root that has signed the servers its own certificate.

20 Claims, 11 Drawing Sheets

Hardware Deployment

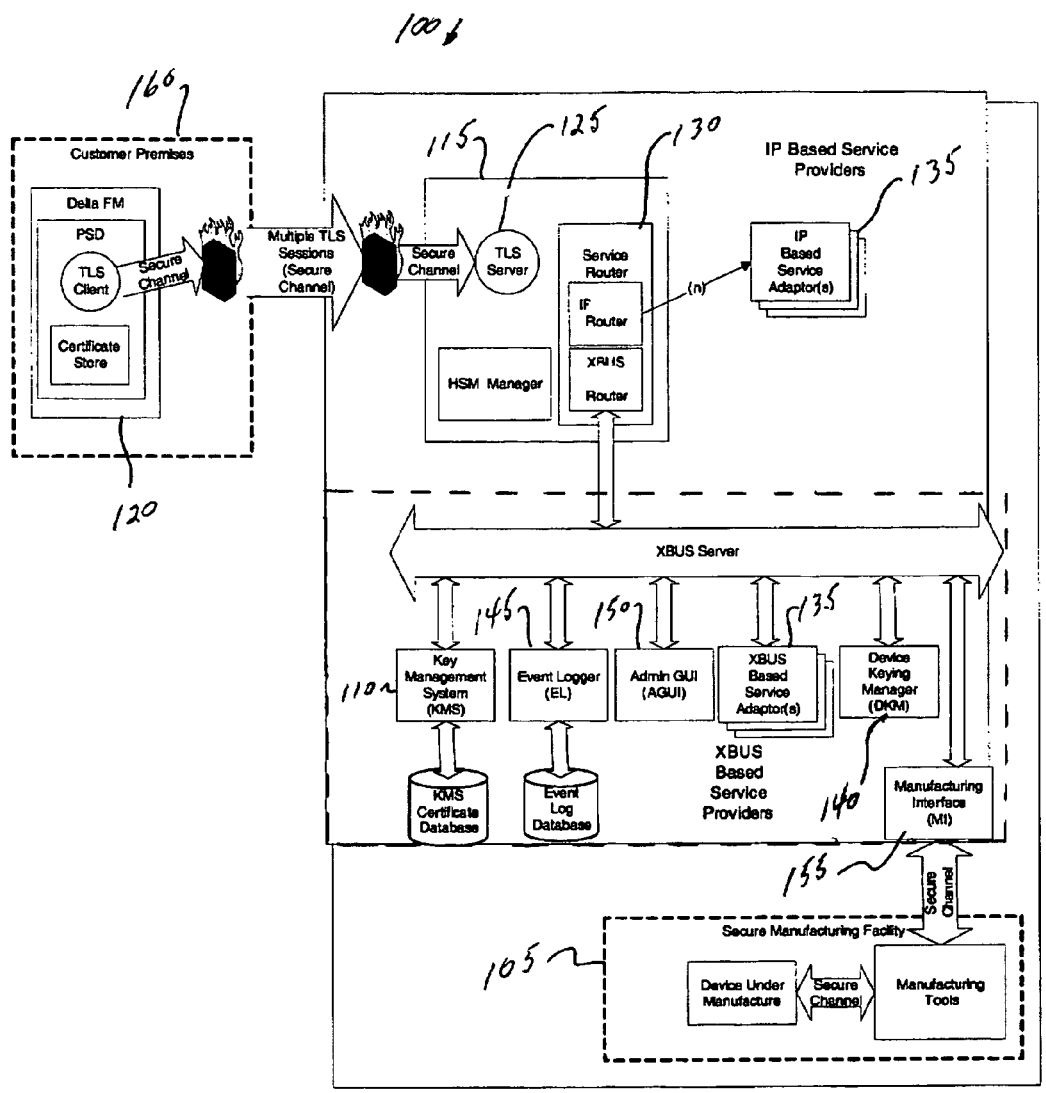
Figure 1 - Exemplary Secure Gateway Application Architecture

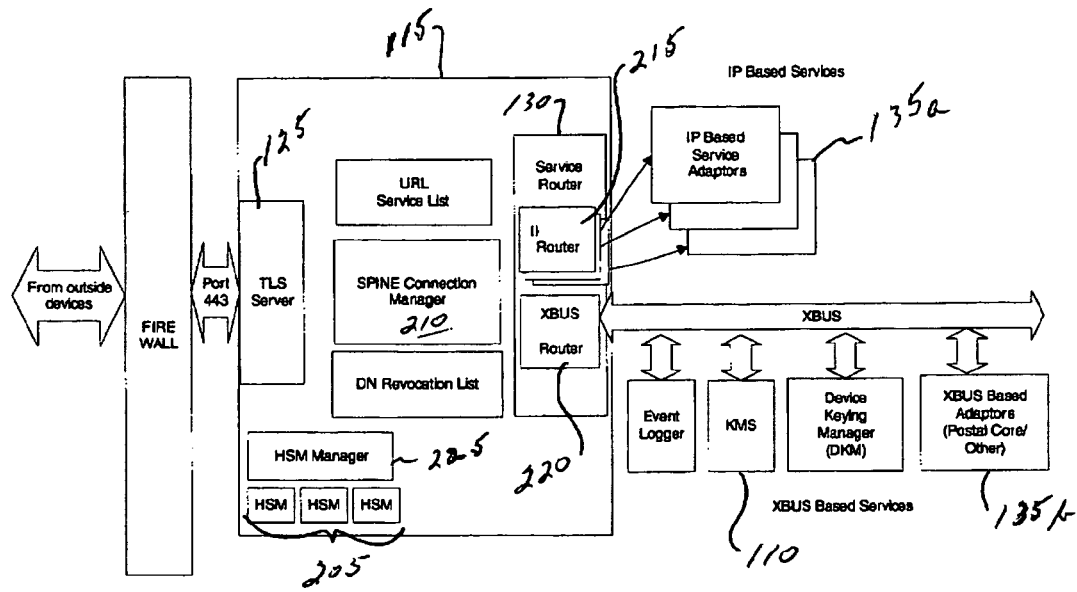
Figure 2 - SECURE COMMUNICATIONS PIPELINE Component Overview
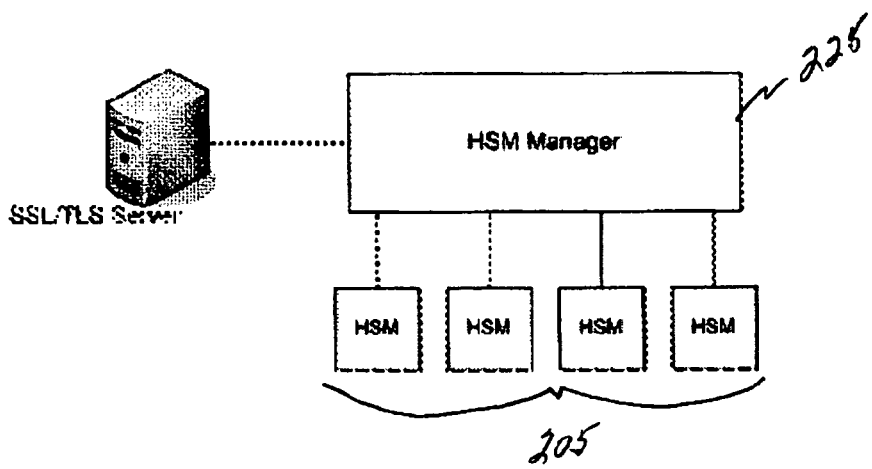
Figure 3 - Hardware Security Module Manager (HSM)

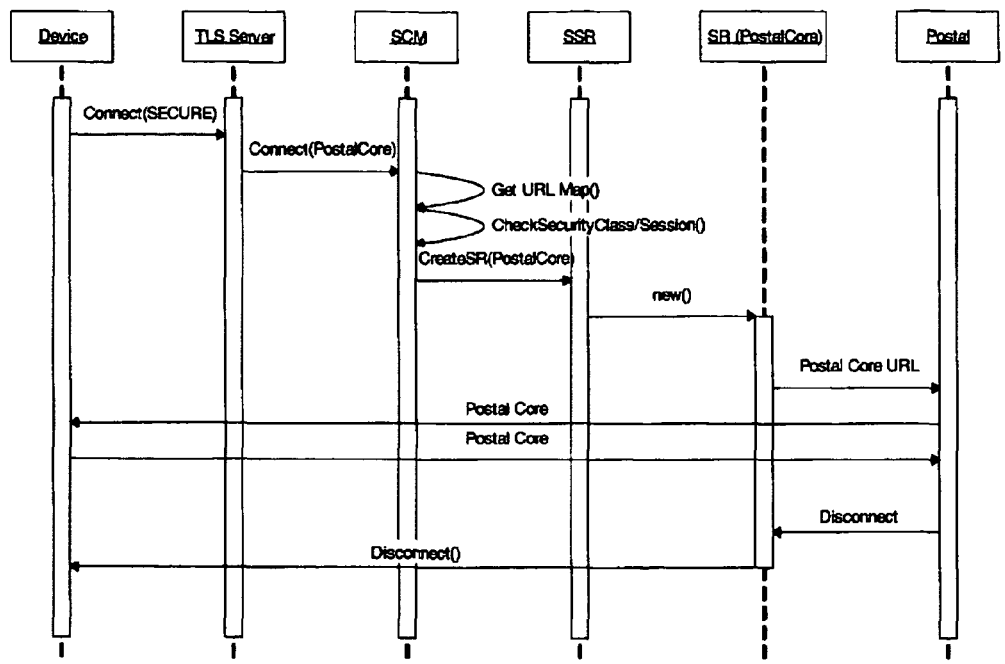
Figure 4
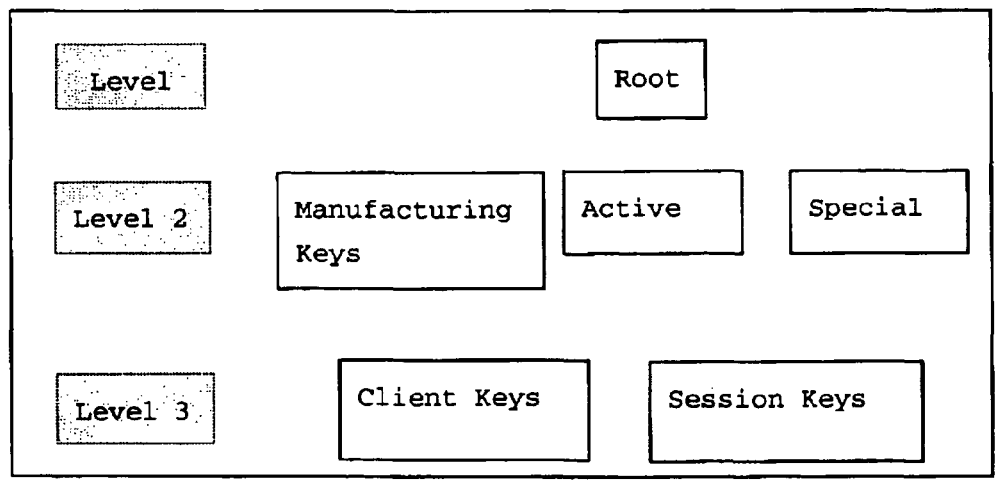
Figure 5 - HSM Devices

Figure 7 - Device re-keying algorithm

Figure 8 - KMS certificate cluster validation

Figure 9 - Device keying manager component interaction

Figure 10 - Hardware Deployment

US 8,046,579 B2

SECURE GATEWAY WITH REDUNDENT SERVERS

BACKGROUND

The disclosed embodiments relate to a secure gateway to a postal service provider infrastructure that provides postal related services.

BRIEF DESCRIPTION OF RELATED DEVELOPMENTS

A high volume postal customer may use a meter which incorporates a Postal Security Device (PSD) to secure the proof of payment of postal indicia. In an exemplary application, indicia may be applied to mailing items that identifies the value of the postage applied and other information. A customer may purchase postage and the purchased value may be stored in the PSD. As the postage indicia is applied to items, the value applied may be deducted from the stored value. Once postage indicia is applied, the item may then be dropped into the collection stream of the particular postal system and subsequently processed for delivery. A customer generally purchases postage by having the meter communicate with a postal service infrastructure, either automatically or manually.

It would be advantageous to provide a secure communications pipeline to a postal service infrastructure that provides postal related services. It would also be advantageous to provide a postal service infrastructure having a common extensible application protocol and structure that accommodates legacy applications and services as well as future applications and services.

SUMMARY OF THE DISCLOSED EMBODIMENTS

A secure gateway includes a TLS server for authenticating connecting devices, a connection manager for routing requests from the TLS server to service provider adapters, and a key management system for providing key management functions, wherein when a device provides a manufacturing certificate to one or more servers of the gateway, servers identify the device as authentic by validating that the manufacturing certificate provided is signed by the same root that has signed the servers its own certificate.

BRIEF DESCRIPTION OF THE DRAWINGS

The foregoing aspects and other features of the disclosed embodiments are explained in the following description, taken in connection with the accompanying drawings, wherein:

FIG. 1 shows an exemplary secure gateway application architecture;

FIG. 2 shows a block diagram of a secure communications pipeline component overview;

FIG. 3 shows a diagram of a hardware security module manager;

FIG. 4 shows an example of system component interaction when a device connects to the secure communications pipeline;

FIG. 5 shows a key hierarchy within hardware security modules;

DETAILED DESCRIPTION OF THE EXEMPLARY EMBODIMENTS

Figure 6:
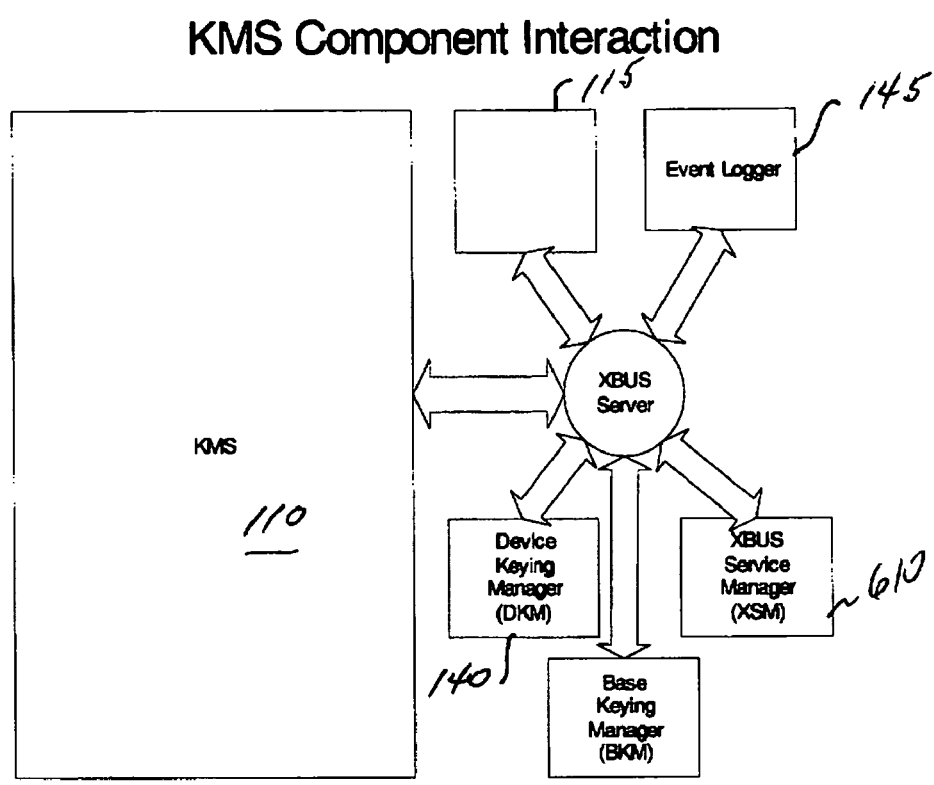
FIG. 6 shows a diagram of key management system component interaction.

FIG. 1 shows a block diagram of a secure gateway architecture 100 suitable for practicing the embodiments disclosed herein. Although the exemplary embodiments will be described with reference to the embodiment shown in the drawings, it should be understood that they may be embodied in many alternate forms. In addition, any suitable size, shape or type of elements or materials could be used.

The embodiments disclosed herein are directed to the secure gateway architecture 100 which may provide:

a secure communications pipeline to serve as the foundation for device and infrastructure communications;

a common extensible application communications protocol that may accommodate adaptation of legacy and development of future funds resetting infrastructures and services;

flexible client connectivity where client entities which wish to connect to a service provider infrastructure may do so via the Ethernet from a LAN connection or modem via an ISP as well as direct modem connection via a postal service provider infrastructure hosted modem pool;

a secure infrastructure that provides for future solutions and insures the bi-directional guarantee that a rogue device cannot be accepted by the service provider infrastructure and a rogue infrastructure cannot be accepted by a real device;

an adaptable, extensible architecture and application protocol that allows for connectivity with current as well as future products; and a system that is reliable, scalable, and robust.

The secure gateway architecture 100 may be based upon an XML messaging architecture referred to herein as an XBUS.

The XBUS may be used as a communication mechanism between the various distributed components that comprise the secure gateway 100.

In the secure gateway 100, a manufacturing system 105 could be implemented on its own XBUS network which would provide an easy mechanism for the various manufacturing workstations to communicate with various manufacturing server components. This Manufacturing XBUS could then be bridged using an XBRIDGE to the main secure communications pipeline XBUS to make use of a Key Management System 110 that is on the secure communications pipeline XBUS. The Key Management System (KMS) 110 GENERALLY provides Key Management services in response to request messages that are sent to it.

Referring again to FIG. 1, the secure gateway architecture 100 may include the following core components:

Secure Communications Pipeline Server 115: The secure communications pipeline server 115 may provide the basic security between a device (meter/base) 120 and the server infrastructure 100. The heart of the secure communications pipeline server 115 may be a TLS server 125 responsible for creating a mutually authenticated secure session between the device 120 and the infrastructure 100. In addition the secure communications pipeline server 115 may provide service routing functionality between the device 120 and its intended service destination adapter via a secure communications pipeline Service Router (SSR) 130. The SSR 130 may provide service routing control between the device 120 and the intended destination.

Adapters 135—An adapter 135 for each service provider may be provided that is supported by the secure gateway architecture 100. These adapters 135 may communicate with the secure communications pipeline server 115 on behalf of a specific SSL/TLS device connection. Field devices may communicate with the adapters 135 using an application protocol specific to each adapter. The application messages may be transported between the secure communications pipeline server 115 and the specific adapter 135 in either a raw IP packet or wholly contained in an XBUS Message envelope as appropriate to the adapter implementation (IP/XBUS).

Key Management System (KMS) 110—The KMS component 110 may be implemented as an XBUS server to provide all of the necessary Key and Certificate management services needed by the secure gateway system.

Keying Manager 140—A Device Keying Manager (DKM) 140 may be responsible for all of the business logic necessary for the re-keying of devices (Meter/Bases) in the field. The DKM 140 acts as any other service or adapter in the secure gateway system 100.

Event Logger (EL) 145—An EL component 145 may be used to log events that occur throughout the secure gateway system 100. It is responsible for storing event information into a common repository and can also be queried to produce a filtered list of events that match a specified criterion.

Admin GUI (AGUI) 150—The AGUI component 150 may provide a user interface that is used to configure and maintain the secure gateway system.

Manufacturing Interface (MI) 155—The MI component 155 may be used by the manufacturing infrastructure 105 to communicate with services offered by on the secure gateway network. This interface may be primarily used by the manufacturing infrastructure 105 to access the Key Management services offered by the KMS 110.

The secure gateway system 100 is able to provide a highly secure gateway to various infrastructure services/adapters using a three tier certificate hierarchy (Root, Region, Device) provided by the KMS component. Using this highly secure gateway, it is possible to route any application protocol from a field device to an infrastructure service.

Secure Communications Pipeline Server Componentization

Turning to FIG. 2, the secure communications pipeline server 115 may be responsible for creation of a secure channel between the connecting device 120 and the secure gateway infrastructure 100 using a mutually authenticated TLS session and secure routing of service requests from TLS sessions to service adapters 135.

This combination of capabilities provides a bi-directional secure pipeline between the connecting device 120 and the secure gateway Services Tier. The device and server can assume the role of client, server or both, at different times. Asynchronous communication can occur in either direction.

TLS Server 125

The TLS server 125 may be used to accept secure connections from outside devices to the secure communications pipeline. This socket server may internally use a bank of Hardware Security Module's (HSM) 205 for the purpose of authentication in the TLS protocol negotiation process.

When a secure connection is accepted by the TLS server 125, the server sends a notification of a new connection to the secure communications pipeline Connection Manager (SCM) 210.

Secure Communications Pipeline Connection Manager (SCM) 210

The SCM 210 is responsible for routing service requests to service provider adapters 135 based on certain criteria. If all criteria are valid the connection proceeds to the secure communications pipeline Service Router 130, the SCM 210 may use an instance of the Service Routing Component 215 to complete the service route.

Secure Communications Pipeline Service Router (SSR) 130

The SSR 130 may include of a collection of service router objects that implement a common interface IServiceRouter, and a class factory to create them, including there are two types of Service Route objects, IP based router and XBus router.

The IP Based Router 215 routes connection to an IP Socket based service provider 135a.

The XBUS Based Router 220 routes connections to an XBUS service provider 135b.

The SSR 130 uses a service list to determine the type of service router for the class factory to instantiate. Once this is accomplished an internal session manager associates the session with the IServiceRouter objects, and transports all data between the session and the service through the IServiceRouter object.

Service Router Interface (IServiceRouter)

The IServiceRouter interface implemented by Service Routers may include of the following methods:

| | |
|---|---|
| CONNECT | New connection occurred |
| DISCONNECT | Existing connection terminated |
| INBOUND_MSG | Message sent from device to service provider |
| OUTBOUND_MSG | Message sent from service provider to device. |

Hardware Security Module Manager 225

The HSM Manager component 225 is responsible for maintaining a dynamic list of all HSM devices 205 that are currently available. As HSM devices 205 become available or as they are taken off line the HSM manager 225 may dynamically monitor the total number of HSM devices available. This component may also provide a set of messages or an interface to communicate the status of each HSM 205 to other system devices. For example, the interface would expose such messages as "GetHSMSummary", ReKeyHSM" and "HSMEvents".

Each HSM 205 is associated with one public/private key pair, that functions in a particular role. There may be multiple HSMs 205 for a particular role on the same machine. For example, the machine that hosts the secure communications pipeline server may contain multiples HSMs 205, with some set of the total HSMs on that machine dedicated to the secure communications pipeline server for use in establishing SSL/TLS session.

The HSM Manager component 225 may transport the various messages, to and from devices.

Secure Communications Pipeline Connection Component Interaction

FIG. 4 illustrates exemplary component interaction when a device connects in to secure communications pipeline.

The secure communications pipeline server 115 is also responsible for re-keying devices in the field which may be required in the following scenarios:

The first secure communications pipeline Server connection after the device is manufactured. The device must be moved from the Manufacturing Security Region to the appropriate Security Region based on the customer. (Typically Country Specific)

The device's certificates are invalid, due to either a Root Key change, or a Region change.

The device's key pair is deemed to expire within a configurable period of time.

In all of these situations the devices certificates must be updated to the current Root, and Region, and potentially a new device key-pair must be generated. The management of these keys and certificates is the responsibility of the Key Management System 110. The secure communications pipeline server 115 is responsible for updating these credentials before a secure session can be created. This device re-keying may take place when the device connects to the secure communications pipeline server initially.

Certificate Verification—This may allow the caller the ability to authenticate a certificate. This may return a response that may indicate if the certificate is verified or, if not, it may indicate why it was not verified.

Certificate Generation—This may allow the caller to create a certificate using a specified public key (as well as some other identifying information). This newly created certificate may be signed by a specified certification authority before being returned to the caller.

Certificate Retrieval—This may be used to retrieve a specified certificate from the certificate store inside the KMS system.

Digital Signature—This may return a digital signature using a specified regional certificate, an arbitrary block of data to sign as well as various parameter to specify the details of how the signing is to be accomplished.

Signature Verification—Given a block of data and a signature, this method may be able to verify that the signature is correct.

Retrieve Root Certificate Chain—Retrieves the chain of root certificates up to a specified date or root certificate in the chain.

Certificate Revocation—Provides a way to revoke a certificate based on its serial number or distinguished name.

3-tier Hierarchy

In order to provide key usage isolation according to function, three tiers of key trust shall be utilized.

At the top of the trust hierarchy, or level one, is the Root Key. The Root key is the umbrella signatory for the rest of the hierarchy.

Level two shall have the Manufacturing, Active Regions and Special Function keys. The Manufacturing key is the key under which devices shall be manufactured. Active Regions are the keys which shall provide the "active" trust when deployed in a particular country or region. The Special Function keys are for the purpose of signing software, rate tables, etc.

Level three shall consist of Client keys which would be at the customer (e.g. device key). Level three would also contain session establishment keys used to establish an active connection with a client.

FIG. 5 illustrates the hierarchy.

Since the private keys within the hierarchy need to be truly private, Hardware Security Modules (HSM) may be utilized to store them. In this manner, when the HSM creates the Private/Public key pair it may only divulge its Public key and the Private key shall never be divulged. There may be multiple HSMs for a single role. For example, the secure communications pipeline server may use multiple HSM for SSL sessions, and the KMS may use multiple HSMs for a region. Alternately, the functionality of the HSM may be incorporated into a computing device secure by its inaccessibility.

Root Chaining

All keys have a finite cryptographic lifetime at the end of which the keys need to be regenerated. Also, there is the theoretical possibility that some of the keys could become compromised. Since the Root key is at the top of the trust hierarchy, a mechanism is established by which its update can be trusted. This shall be accomplished through "Root chaining". Root chaining is the technique by which the current Root certificate has information about the next (child) Root. This is accomplished by inserting the hash of the next Root certificate into the Current Root certificate. In this manner when the Root is updated, the clients in the field can verify that the new Root is legitimate based upon the hash that was stored in the old Root certificate.

FIG. 6 illustrates the key management system component interaction

The KMS 110 may interact directly with many of the secure gateway components. The following is a description of those interactions:

Secure Communications Pipeline 115—The secure communications pipeline 115 uses the services of the KMS 110 in order to manage the HSM (Hardware Security Modules) 205 used to establish the secure connections.

Device Keying Manager (DKM) 140—The DKM 140 uses the KMS services to perform Device Key Maintenance.

XBUS Service Manager (XSM) 610—The XSM 610 is responsible for launching and monitoring the KMS component 110.

Event Logger (EL) 145—The KMS 110 uses the EL 145 to log events that are associated with Key Management. These events would include when a certificate is revoked, when a root or region is re-keyed, etc.

Key Management System Interface

Services may be provided to any client that can connect to the KMS. Protected services may be available only on the machine that hosts the KMS.

An exception may be identified if a system failure prevents one of the following operations from completing or invalid input was provided (e.g. an XBus failure, network failure, server failure, server error, out of memory, empty or invalid certificate chain, etc.)

Certificate Verification

The system may authenticate an entity based on a certificate (device, software, KMS server, client application, others as appropriate) and associated certificate chain. It may report back results of verification, with responses such as Verified, Verified Not Current, Verified Region Not Current, Verified Root Not Current, Not Verified, Valid Manufacturing Region, Valid Unknown Region, Invalid, Revoked. If the regional certificate authority is not one that is managed by this KMS instance, the system may check if the unknown regional certificate is correctly signed by the current root.

The system may also check that the certificate has not expired, and that it is not contained on the Certificate Revocation List (CRL) or the Distinguished Name Revocation List (DNRL).

The system may return a value to indicate if the certificate was verified, and if not, the reason for non-verification.

Authentication may be based on the number of certificates in the chain.

| CertificateStatus | Meaning |
| --- | --- |
| Verified | The certificate is valid and the entire certificate chain is valid and up-to-date |
| Verified Region Not Current | The certificate is valid with respect to the certificate chain, but a newer middle-tier certificate is available. |
| Verified Root Not Current | The certificate is valid with respect to the certificate chain, but a newer root certificate is available. |
| Not Verified | The certificate or one or more of the certificates in the chain could not be verified. |
| Valid Manufacturing Region | The certificate and certificate chain are valid and up-to-date, and the middle-tier certificate authority is the special manufacturing region |
| Valid Unknown Region | The certificate and certificate chain are valid and up-to-date. The middle-tier certificate authority represents a region that is validly signed by the root but is other than the one that the validating KMS manages |
| Invalid | The certificate is badly formed |
| Revoked | The certificate has been revoked (i.e. it was found either on the region's CRL or DNRL) |
| Expired | The certificate has expired. |

The method may first check for certificate expiration. It may next determine whether or not the certificate has been revoked by checking the DNRL and, if necessary, the CRL. It may then validate the certificate against the supplied certificate chain, starting with the certificate at the lowest security tier in the chain.

Certificate Generation

The system may generate a certificate for an entity based on the entity's public key. Included with the public key may be the distinguished name for the certificate, and any other information to be contained in the certificate.

A certificate can be generated at one of the specified levels: Root, middle or device.

The method may create a certificate with the given information, using the appropriate certificate authority from the provided certificate chain as the issuer. The issuer also determines the security hierarchy level of the generated certificate. It may then request that the authority digitally sign the new certificate with its private key. Once signed, the certificate may be returned to the requesting entity.

Certificate Retrieval

The system may be able to retrieve a certificate or certificates based on certain criteria, such as the subject's distinguished name, the serial number, the issuer or the expiration date.

Search types include:
Subject distinguished name
Certificate serial number
Certificate issuer
Certificate expiration date
Revocation status
Security hierarchy level The method may query the KMS certificate store based on the specified search criteria.

Report Information

The system may be able to provide information to report on its condition and operation. It may be able to report statistics on its operation, such as the number of certificates verified, the number of digital signature created, etc.

Reports can be generated for a date range and be further specified by optional query parameters such as region. The report can be generated in one of several output formats, such as text, Excel spreadsheet, HTML or RTF.

The method may generate the report in the specified format based on the query criteria supplied. The report query criteria may be a simple collection of name-value pairs indicating the type of report being requested and the values to be searched.

Digital Signature

The system may provide a digital signature for an arbitrary block of data. Given a block of data, a signature algorithm identifier, and an identifier for the signer, the system may create a digital signature for the data block.

Access to HSMs for the purpose of signing an artifact (e.g. software, a certificate, etc.) may be restricted based on the HSM's role. For example, the root HSM can only be used for signing middle tier (e. g. regional) certificates subject to access by authorized person(s).

The issuer identified in the specified certificate may be the signer of the data block.

The method may validate the signer's certificate. On successful validation, it may determine, based on the signer, which HSM may be needed to perform the signing operation. It may make the signing request of the HSM and return the resulting signature to the requester.

Signature Verification

Given a block of data, a signature, an identifier for the signer and a signature algorithm identifier, the system may attempt to verify the signature.

The issuer identified in the specified certificate may be the signer of the hashed data block.

The return value may be true if the data block was in fact signed by the identified signer, false otherwise.

The method may obtain the public key from the supplied certificate and decompose the signed data block into the signature and the actual data. It may then create two digests, one by decrypting the signature using the specified algorithm and the other by hashing the data block. After both digests have been created, they may be compared. If they match, the signature is verified.

Certificates and Certificate Collections

Certificates may be represented as Base64-encoded string elements in the XML stream. A Base64 encoding is used because it can safely encode any arbitrary string of bytes into a textual representation. A certificate collection may simply be an element with certificates as child elements.

```
<Certificates>
<Root>ab12b311a231fe23ac98ab12b311a231fe23ac98ab</Root>
<Reg>12b311a231fe23ac9812b311a231fe23ac9812b311a</Reg>
<Dev>b311a231feb311a231feb311a231feb311a231feb31</Dev>
</Certificates>
```

As shown, the collection contains certificates of type root, regional and device. The full range of element names for the various certificate types is:

| | |
|---|---|
| Root | Root-tier root certificate |
| Reg | Middle-tier regional certificate |
| Dev | Device-tier device certificate |
| Sess | Device-tier session certificate |

Other Data Streams

Several interface functions call for data blocks and signatures. These may also be represented as Base64-encoded strings, as follows:

```
<Block>12b311a231fe23ac9812b3231feb
11a231fe23ac9812b311a</Block>
<Sig>b311a231feb311a231fe
311a231feb311a231feb311a231feb31</Sig>
```

Device Keying Manager (DKM)

The Device Keying Manager (DKM) is implemented as an XTRAN Server for the purposes of executing the business logic necessary to perform the appropriate Key Maintenance on a Devices that has connected from the field. The DKM acts as service on the SECURE COMMUNICATIONS PIPELINE and is only accessible when a Device has anonymously connected to the SECURE COMMUNICATIONS PIPELINE, or connected to SECURE COMMUNICATIONS PIPELINE with specific re-keying certificates, for the purpose of Key Maintenance. Once the device establishes a session with the DKM, the DKM will first identify the type of device needing key maintenance by examining the device certificate "usage" field. The DKM will now determine the type of Key Maintenance that is necessary. The possible Key Maintenance functions that are performed by the DKM are as follows:

Resigning a Device's certificates
Updating a Device's Root and Regional certificates
Re-keying a Device The DKM uses the services of the KMS XCOMP for validating certificates, signing certificates, getting the latest root and regional certificates, etc.

Re-Keying

When a Device is unable to connect to the SECURE COMMUNICATIONS PIPELINE using Two-Way authentication, it will know that it must perform some level of Key Maintenance. At this point the Device will attempt to connect to the SECURE COMMUNICATIONS PIPELINE using an anonymous SSL/TLS connection. By default, the only "Class" of service that a Device can connect under an anonymous connection is the DKM.

Figure 7:
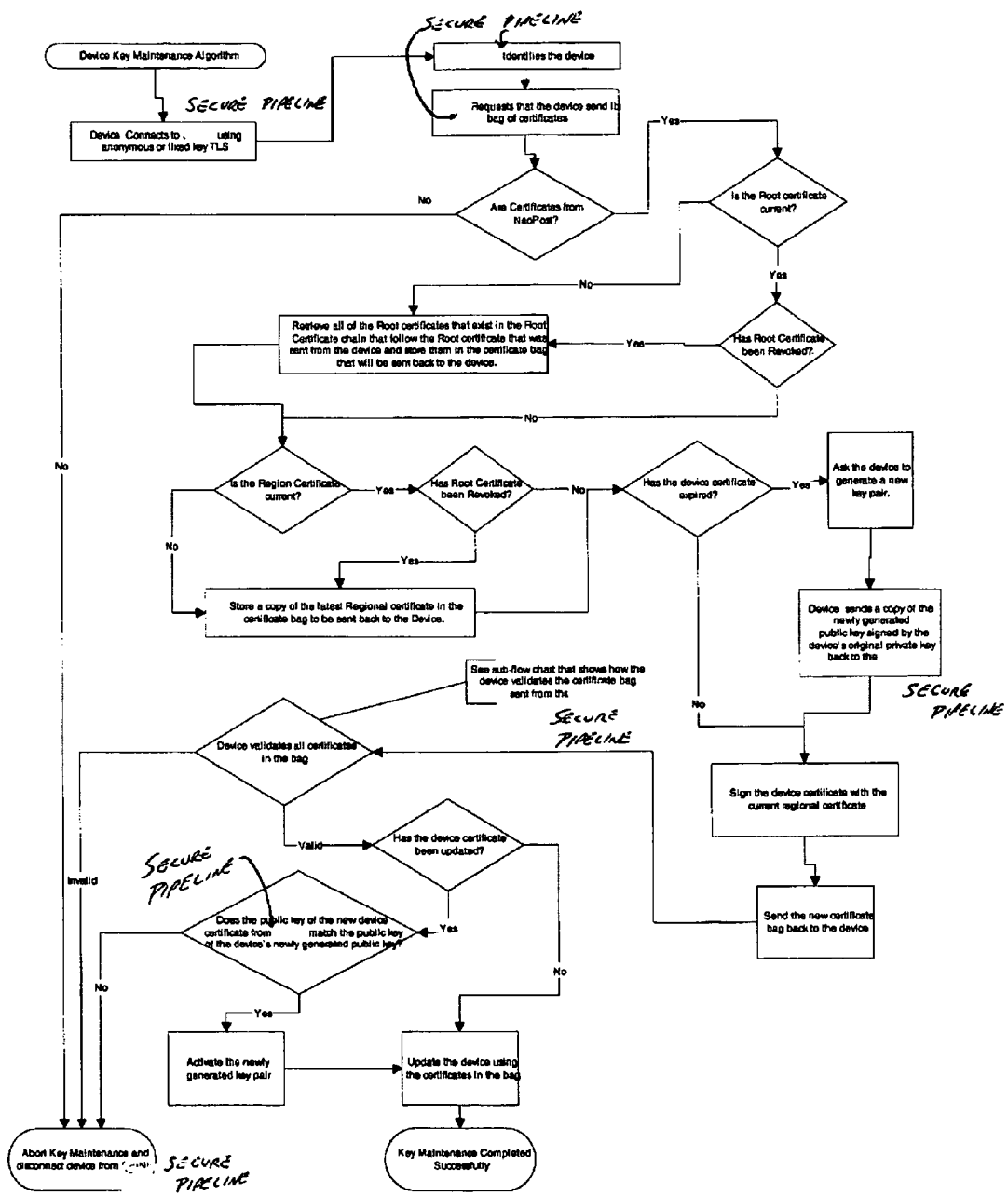
FIG. 7 shows an exemplary re-keying algorithm.

Once connected, the DKM will request the Device's current certificates. These certificates will be validated to make sure that they originated from the secure gateway architecture 100 and identify the type of device that is connected. Next these certificates will be examined to determine the level of Key Maintenance that is required, which may include one or more of the following:

The Root certificate needs to be updated
The Regional Certificate needs to be updated
The Device's certificate has expired and needs to be Re-Keyed
The Device's certificate needs to be resigned by the current Regional certificate FIG. 7 shows a flow chart that shows the Re-Keying algorithm.

Figure 8:
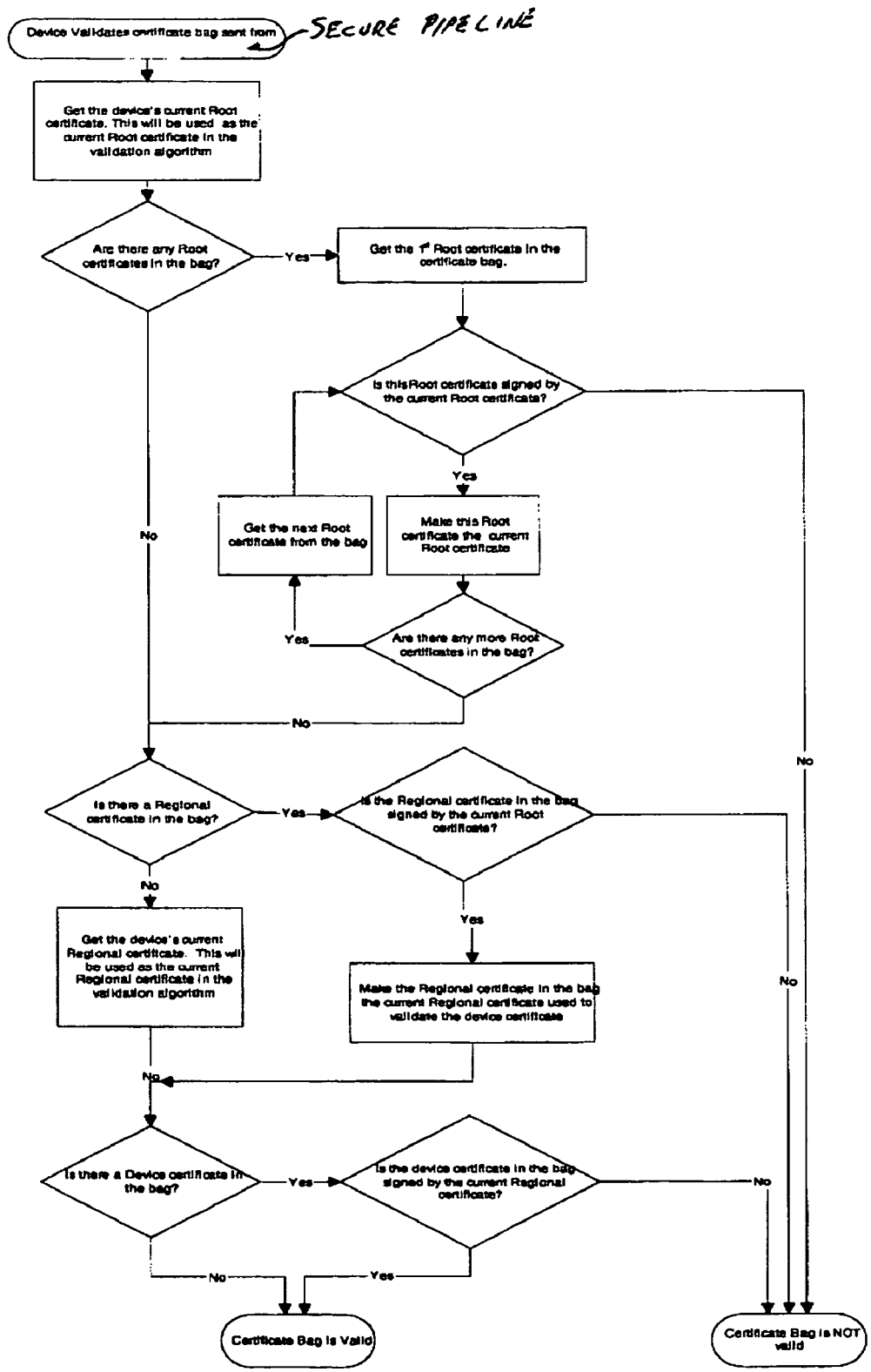
FIG. 8 shows a process for key management system cluster validation.
Figure 9:
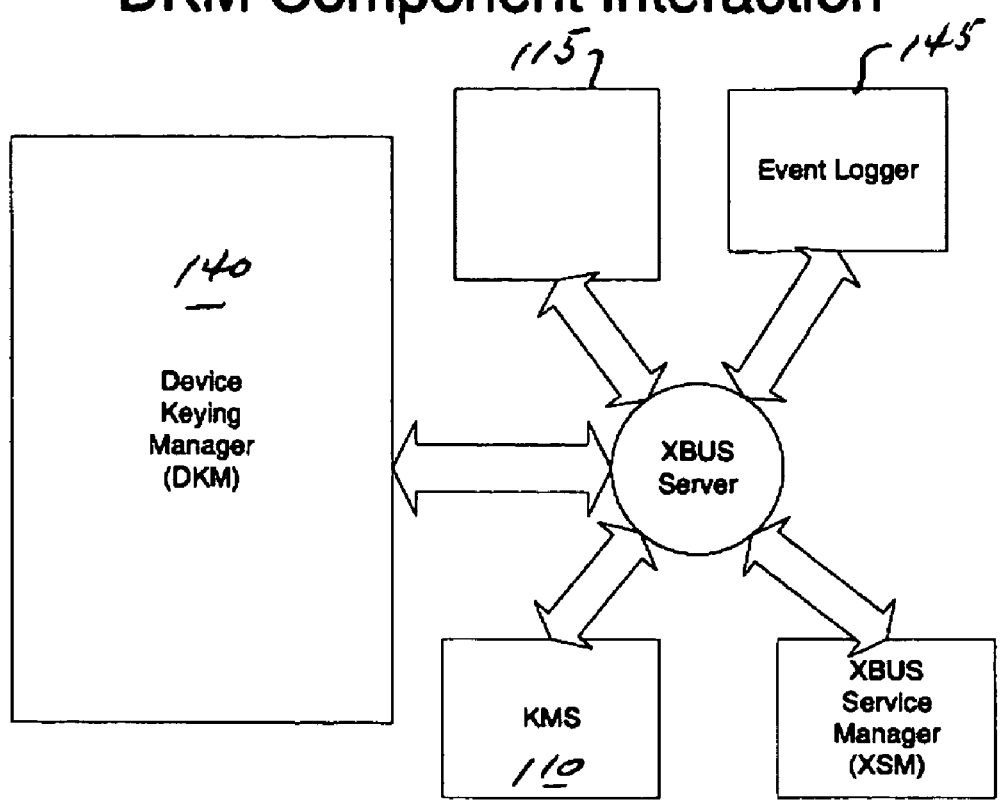
FIG. 9 shows component interaction for a device key manager.

FIG. 8 shows a sub-flow diagram showing how a certificate cluster is validated for its authenticity.

Re-Keying Device Implications

The re-keying algorithm will have the following implications on the device:

The device must have the ability to generate an authentication key pair that is temporary. Creating this temporary key pair will not affect the current authentication key pair. This key pair could be thought of as the "next" key pair.

The transition from current authentication key-pair to "next" authentication key pair can only take place when the device is presented a matching certificate that contains the "next" public key, and can be validated up to the current root certificate that the device contains.

The Device Keying Manager (DKM) interacts with the components as:

SECURE COMMUNICATIONS PIPELINE—When a device connects for key maintenance, the SECURE COMMUNICATIONS PIPELINE routes those devices to the PKM. During the key maintenance process, the PKM communicates with the device via the SECURE COMMUNICATIONS PIPELINE.

Event Logger (EL)—As the PKM performs the necessary key maintenance operations on the device, it will log messages to the EL to indicate what actions were performed.

Key Management System (KMS)—The PKM interacts directly with the KMS component for all of the key maintenance services (i.e. getting certificates, validating certificates, signing certificates, etc) necessary for updating and re-keying the device.

XBUS Service Manager (XSM)—The XSM is responsible for launching and monitoring the PKM.

Adapters 135

Adapters 135 are software components that sit between secure communications pipeline and service providers that are required by clients. They exist to translate the messages sent over secure communications pipeline to the format that is required by service provider.

An adapter is used for each postal core service. A generic message protocol may be used to reset meter funds, and it is the adapter that translates the protocol into the proper calls to the actual postal core service. In this case the adapter may be responsible for parsing the message delivered by secure communications pipeline, and translating for the actual postal core. Similarly, the adapter may take the specific responses and calls from the postal core and translate them into the protocol before sending them to secure communications pipeline to be delivered to the client.

There may be situations where an adapter may not be needed between secure communications pipeline and the service provider. Such a situation would exist where secure communications pipeline is channeling messages to a web service.

Secure Communications Pipeline Server Redundancy

Secure communications pipeline server redundancy provides redundant servers for both the secure communications pipeline server as well as the business server. The secure communications pipeline server may require hardware Security Modules (HSMs) that are used to establish SSL sessions with clients. For this reason, both secure communications pipeline serversSecure communications pipeline servers shall "listen" to one virtual IP address and therefore each shall handle a share of the connections. If one of the secure communications pipeline servers becomes disabled, then one of the remaining server shall take the full connection load. The secure communications pipeline servers are not being relied upon for load sharing as each one is capable of handling the full connection load.

Each secure communications pipeline server shall have a Primary and Secondary connection to the Business Servers. Normally secure communications pipeline server (SS) #1 would be connected to Business Server (BS) #1 and correspondingly SS #2 would be connected to BS #2. If either Business Server becomes unavailable, then the corresponding secure communications pipeline Server would switch its connection to the other Business Server.

Business Server Redundancy

The Business Server houses the business logic, the KMS with its Hardware Security Modules, optional manufacturing services and potentially adapters to infrastructure services. Servers would have HSMs for regional CAs. However, these would not be duplicates (same private keys) but rather unique keys. There may be only one deployed system that would have the Root key. The Root key HSM would be only located on one of the Business Servers.

Scaling

Figure 10:
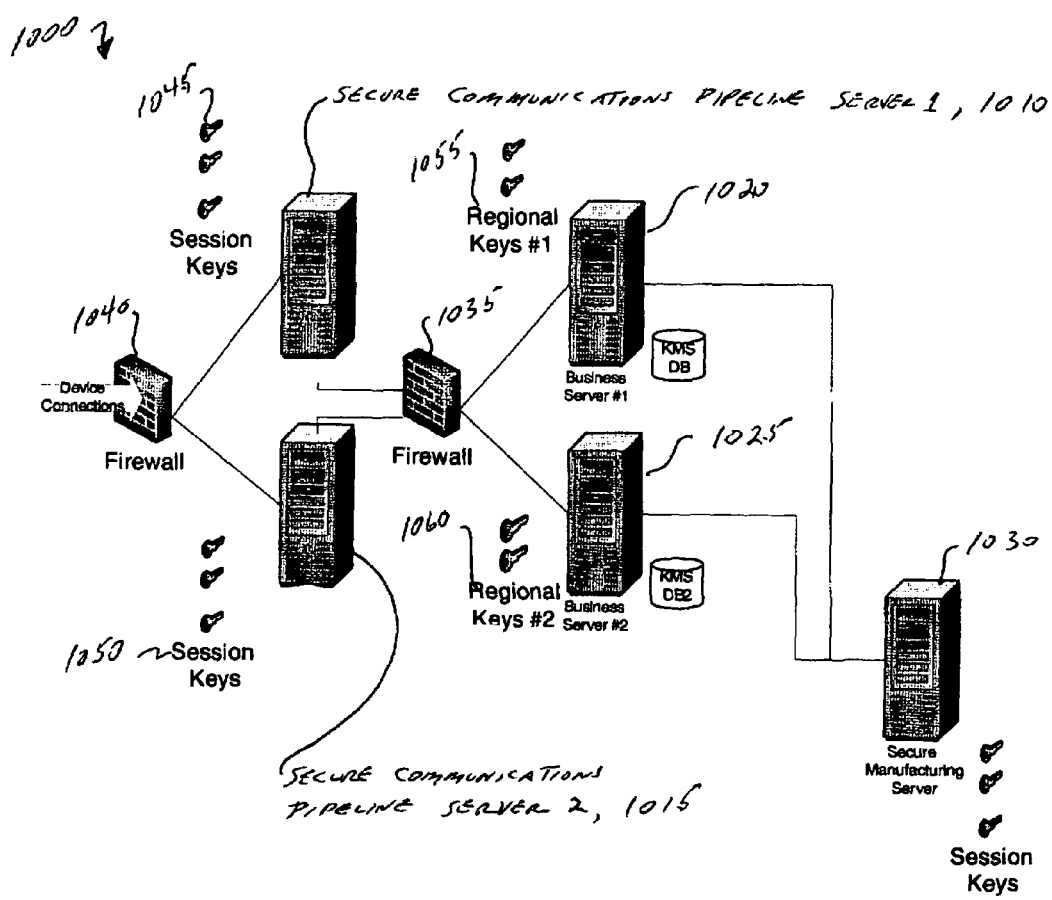
FIG. 10 shows an exemplary hardware deployment.

While FIG. 10 shows the servers in pairs for the sake of simplicity, if the system ever had to be scaled to increase capacity then another set of servers could be added.

The present invention is directed to a secured gateway into a postal service providers infrastructure, such that devices like mailing machines could securely connect into the infrastructure using both authentication as well as encryption. Communication within the infrastructure could be in the clear but is not limited in this way. The burden of authentication and encryption may basically stop and start at the secured gateway. The gateway is referred to herein as the secure communications pipeline. The secure communications pipeline essentially operates using public key methods in order to provide authentication of both the server to the client connecting in as well as to enable the server to authenticate the client. It may be a mutual authentication and may be based upon the standard SSL. The present invention is directed to:
  providing a system that is redundant, meaning that if portions of it failed that it would continue to run;
  that is scaleable such that when the demand for having more machines connected into the infrastructure increases, the server can still keep up with the increased number of connections; and
  providing disaster recovery capabilities and functions that could take over in the event that the primary hosting site that is hosting this server would become severely incapacitated as due to a fire or some other calamity.

In cases where the service postal provider operations would have to be moved physically to some other site, there may be equipment set up already at another physical location and some means of manual switch over is typically necessary and also considered acceptable. In the case of the primary site, there may be a requirement to have the system available 99.9% of the time. The present invention provides this by providing sufficient redundancy in case there is some sort of a failure either due to a hardware problem or even perhaps a software glitch.

As part of the authentication process, a certificate hierarchy is utilized. At the top of the hierarchy there is a root key which is a public/private key pair, and then underneath there is a regional tier such that particular regions of the world would have their own regional key pairs, as the United States, for example, would not have to use the same region information as France would or another installation. Below the region is the actual device that would be connecting in as well as the low level session based communication.

All hierarchies may be supported by hardware that is highly secure, typically this is referred to as a hardware security module, which contains the private key internally. Alternately, the functionality of the HSM may be incorporated into a computing device secure by its inaccessibility.

The devices certificates may be subordinate in relationship to one another. At the lowest level there might be the actual mailing machine. Devices at that level would be signed by the associated regional level and the regional level itself would be signed by the root. Thus one can always verify that if a certificate had been signed by, for example, the device. When the initial session is being set up and there is information being transferred from the device to the server, the private key within the device actually signs the information and then packages the certificate to go along with it, the certificate being that piece which has the public information. If one has the certificate for the region one can then verify that indeed the device certificate is valid by examining the root certificate as valid, then one can validate that the regional certificate is valid. Hence, there is a certificate hierarchy by which all certificates can be validated up through the root.

When devices destined for the field are initialized in the factory they undergo an initialization or a manufacturing process. From a cryptographic standpoint the device is requested to generate a public private key pair. That public key is then put into an X509 certificate and that X509 certificate is signed by the manufacturing region. There is a segregated region called the manufacturing region. The manufacturing region certificate is in turn signed by the root.

Referring to FIG. 10, in one hardware deployment embodiment 1000 there may be 4 server machines 1010, 1015, 1020, 1025 plus a secure manufacturing server 1030. The server machines 1010, 1015, 1020, 1025 are split up in this manner mostly for security sake as well as redundancy sake. The horizontal level, for example, secure communications pipeline server 1010 and business server 1020, comprise a functional entity. The reason that they are split apart into servers with a firewall 1035 in between again is for security reasons. The front server 1010 is close to the internet and has a firewall 1040, it may have a minimum amount of functionality, so that any important business logic or data would be separated on a different server, e.g. 1020 with a firewall 1035 in between.

There are session keys 1045, 1050 associated with each secure communications pipeline server 1010, 1015. The number and configuration of the secure communications pipeline servers and business servers is for example only. Other configurations and numbers of servers may be utilized as appropriate. The secure communications pipeline servers 1010, 1015 listen to a virtual IP Address, in other words the same address, and in effect, every new connection that comes into the system is doled out to a different secure communications pipeline server. Doling may be done in a round robin fashion. If one server becomes disabled, it may no longer be able to participate and the remaining server or servers may pick up the load. Thus, the secure communications pipeline servers 1010, 1015 are configured to be redundant such that if one fails the other existing servers are available to assume the new connections as they occur.

The business servers 1020, 1025 are set up with a similar redundant configuration for the same reason. Normally, there is a connection between secure communications pipeline server 1010 and business server 1020, and between secure communications pipeline server 1015 and business server 1025. Additional secure communications pipeline servers and business servers may also be a part of the hardware deployment embodiment 1000. The connections may be soft in the sense that each of those secure communications pipeline servers 1010, 1015 is configured in such a way that they have a primary business server designated as well as other secondary business servers. When a particular secure communications pipeline server is started it may generally examine its configuration and the primary business server and try to connect to it. If it cannot, it tries the alternate business servers until it finds one that is functional. Thus, the business servers 1020, 1025 are also configured to be redundant such that if one fails the other existing business servers are available to assume new connections from the secure pipeline servers as required.

Because there are associated hardware keys, both for the session set up 1045, 1050 as well as the regions 1055, 1060, managing the information requires innovative solutions. Previous systems did not have provisions for having this level of redundancy within a site. The present invention provides a direct improvement with redundancy provided locally. Previously there was one region for a device 120 (FIG. 1) and if a system failed and for example had to be rebuilt, that device 120 would physically have to be moved in order to be then utilized. In the present embodiments there may be a logical region with the possibility of multiple physical representations through multiple physical hardware devices, each of which actually would have a unique private public key pair always signed by the root. Thus, the session keys 1045 on secure communications pipeline server 1010 may be signed by the regional device on business server 1020.

If this hierarchy is preserved the same would correspond on business server 1025 and secure communications pipeline server 1015 in the sense that the session keys on secure communications pipeline server 1015 would be signed by the regional device on business server 1025. The information regarding these signatures also relates to the actual devices 120 that are at the customer's site 160 (FIG. 1). When they are first manufactured, their certificates are signed by the manufacturing region. When a device 120 first connects, for example after having been purchased by a customer and the first time that the customer tries to call for example to obtain funds, the connection could be made into one of the secure communications pipeline servers 1010, 1015 and it may be quite unpredictable as to which one.

Nevertheless, logic may be implemented such that it would be seen that that device 120 is not yet part of the associated region. The associated region is the logical region within a country or locale. Regardless of which secure communications pipeline server 1010. 1015 a device 120 actually connects into, the logic would be to take that device certificate as well as the manufacturing region certificate within the device 120 to bring them up to the server and ultimately to have the device certificate resigned by the regional device. The resigned device certificate along with the new regional certificate would be sent back to the device. The device 120 may always check the validity of those certificates that came back to it because they can be traced to the root certificate.

Another scenario might include a device 120 brought into this logical region and the next time that it connects in, for example, to download funds, it may be connected to a different secure communications pipeline server 1010, 1015. In this case, this does not present a problem because even though it is not connected to the secure communications pipeline server 1010, 1015 to which it had connected the first time, nevertheless, it contains the certificates and ships them up to the secure communications pipeline server 1010, 1015. The secure communications pipeline server 1010, 1015 does not need to have prior knowledge of that regional certificate because it simply takes it from the device 120, takes the device's certificate validates it against that regional certificate that was passed up from the device and that in turn is then validated against the root. Each component may have the capability to validate the chain up to the root. The impact of this is that the regional business servers, 1020, 1025 even though they are redundant, need not communicate any information to each other. This is advantageous to the management of the system because otherwise there would have to be various forms of database replication. In another embodiment, secure communications pipeline server 1015, may normally be connected to business server 1025. If business server 1025 fails, secure communications pipeline server 1015 will then find another business server that is available, which in the case of the hardware deployment FIG. 10 would be business server 1020. Business server 1010 never needs to know about the actual regional certificate that was used originally to sign it because it would obtain that regional certificate information from the device 120 itself.

The manufacturing server 1030 may also be redundant and configured such that communications from business servers 1020, 1025 are routed alternately to each server. If one or more manufacturing servers is non functional, communications may be routed to the other manufacturing servers until an operational manufacturing server is found. The device 120, upon initialization during manufacturing shall have its first certificate, that being signed by one of the manufacturing region certificates, provided by any one of the redundant manufacturing servers 1030. The particular redundant secure communications pipeline server 1010, 1015 will have its certificate signed by the top-level root certificate, the server's certificate being utilized to sign the devices own internally generated certificate.

Figure 11:
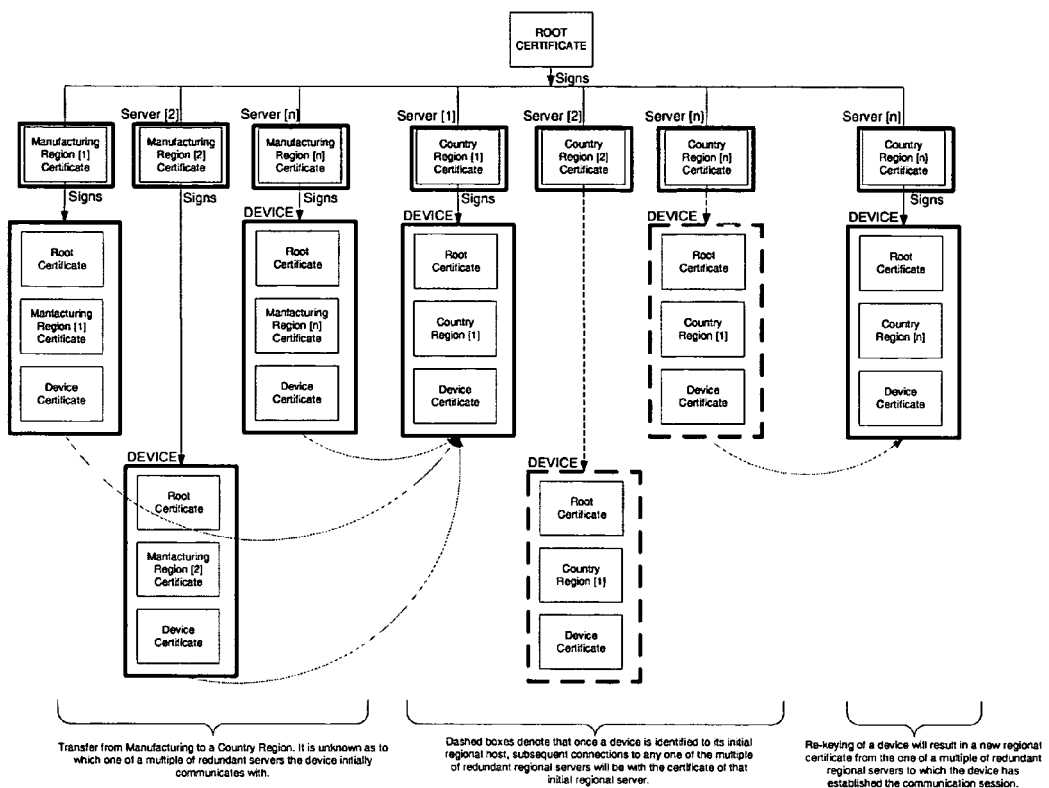
FIGS. 11-13 show how device certificates are managed.
Figure 12:
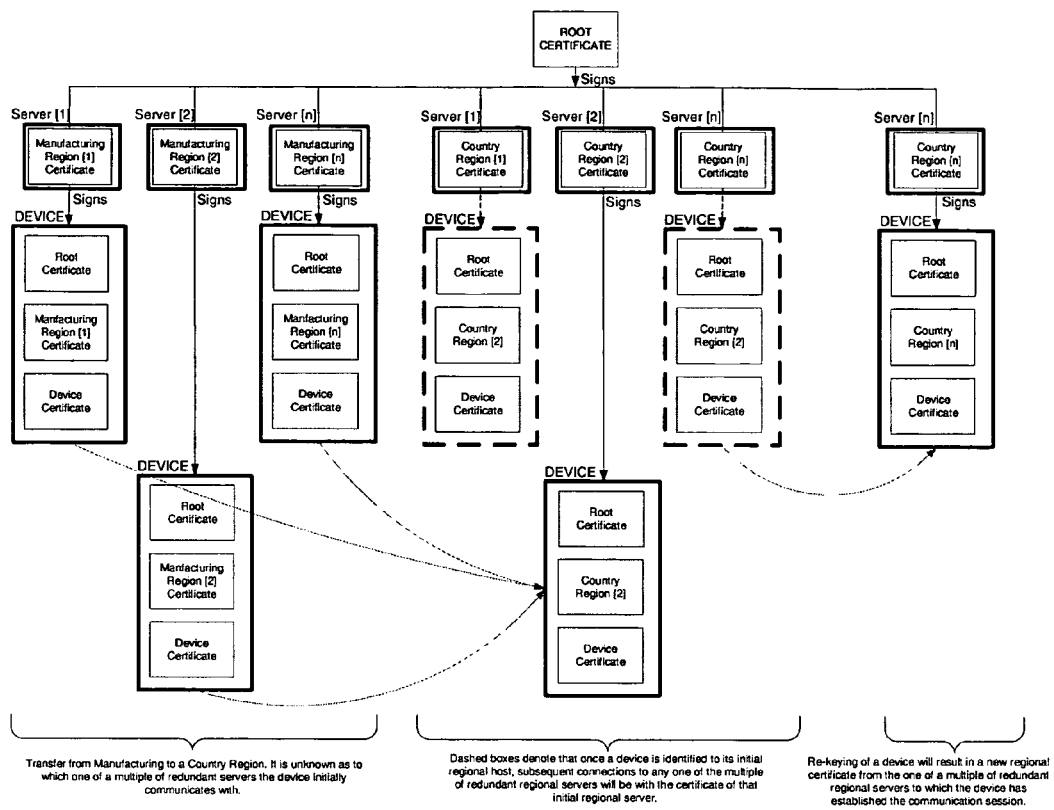
Figure 13:
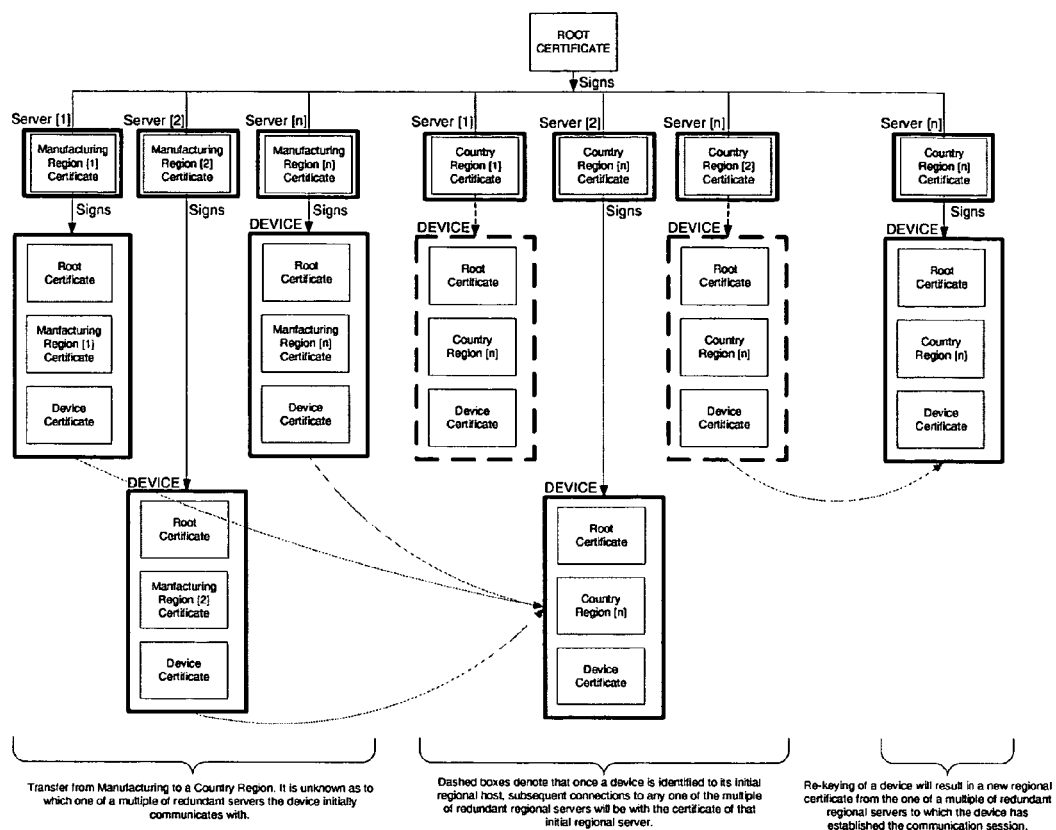

Referring to FIGS. 11, 12 & 13, the device 120 upon introduction into a region, where the region is represented by more than one redundant secure communications pipeline servers 1010, 1015 will provide its manufacturing certificate to the said one of the redundant region or business servers 1020, 1025. The particular region business server will identify said device as authentic by validating that the manufacturing certificate presented is signed by the same root that has signed its own region certificate. Thereupon, the redundant business server proceeds to sign the devices certificate with its region certificate, said certificate being returned to the device 120. At this point the device is known to the one, of more than one redundant region business servers.

Referring again to FIGS. 11, 12 & 13, when the device 120 initiates a future communication session with its region, said device has no indication of which of the more than one redundant region business servers it has connected to. Consequently, for the redundant business server to authenticate the device, said server examines the device certificate chain as presented by the device to the server. Said certificate chain shall contain the device certificate, the regional certificate of the region that signed the device certificate, and the root certificate. If the redundant region business server determines that the devices certificate has a signing chain traceable to their common root certificate, the region redundant business server has authenticated the device. Said mutual authentication allows the communication session to continue.

Should a device key-pair change be necessary, when a device attempts to establish a session with its region, any one of the more than one region redundant servers with which the device has initiated communication may instruct the device to generate a new key pair where said public part of the key pair shall be placed in a certificate and in turn will be signed by the one of more than one region redundant host's regional certificates to which the device is communicating. Said certificate returned to the device, replacing its previous region certificate.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for authenticating postal devices, comprising:
a postal device including a device processor coupled to a device memory storing a device private key, a first device certificate, and a first server certificate, the first device certificate comprising a device public key and a digital signature of the device public key based upon a first server private key, the first server certificate comprising a first server public key and a digital signature thereof based upon a root private key;
a first server including a first processor coupled to a first memory storing the first server private key and the first server certificate;
a root server including a root processor coupled to a root memory storing the root private key and a root certificate comprising a root public key;
a second server providing functionality to said postal device redundant to functionality provided by said first server, said second server including a second processor coupled to a second memory storing a second server private key, a second server certificate comprising a second server public key and a digital signature thereof based upon the root private key and instructions configured to be executed by the second processor to receive from the postal device at the second server the first device certificate and the first server certificate, authenticate the first device certificate using the first server certificate, authenticate the first server certificate using the root certificate and send a second device certificate to the postal device,
each of said first server and said second server being configured to service said postal device while said postal device is in an operational state,
the system configured not to replicate data between said first server and said second server.

2. The system of claim 1, wherein at least one certificate from the group of the first device certificate, the first server certificate, and the second server certificate have a finite cryptographic lifetime at the end of which the at least one certificate is no longer valid.

3. The system of claim 1, wherein the root public key is a first root public key and the rot certificate further comprises a hash of a second root public key.

4. The system of claim 3, wherein the root certificate is a first root certificate, and the root memory further stores instructions configured to be executed by the root processor to receive a second root certificate that includes the second root public key, calculate the hash of the second root public key, compare the calculated hash with a hash included in the first root certificate, and if the calculated hash corresponds to the hash included in the first root certificate, then to replace the first root certificate with the second root certificate.

5. The system of claim 1, wherein the second memory further stores instructions configured to be executed by the second processor to receive from the postal device the first device certificate and the first server certificate, authenticate the first device certificate using the first server certificate and authenticate the first server certificate using the root certificate and, if the certificates are successfully authenticated, to digitally sign the device public key using the second server private key and send to the postal device a second device certificate that includes a digital signature of the first device certificate based upon the second server private key.

6. The system of claim 1, wherein the device private key is a first device private key, and the device public key is a first device public key, and the second memory further stores instructions configured to be executed by the second processor to receive from the postal device the first device certificate and the first server certificate, authenticate the first device certificate using the first server certificate and authenticate the first server certificate using the root certificate and, if the certificates are successfully authenticated, send to the postal device a request for a second device public key, receive from the postal device the second device public key, digitally sign the second device public key using the second server private key and send to the postal device the second device certificate that includes the second device public key and a digital signature thereof based upon the second server private key.

7. The system of claim 1, wherein the first server is located in a first region and the second server is located in a second region.

8. The system of claim 1, wherein the first server and the second server are located in the same region.

9. The system of claim 1, wherein there is no substantial data communication between said first server and said second server.

10. A method for authenticating a postal device having a first device certificate and a first server certificate for a first server, the first device certificate including a device public key and a digital signature thereof based upon a first server private key, the first server certificate having a first public key and a digital signature thereof based upon a root server private key, comprising:
receiving from the postal device at a second server the first device certificate and the first server certificate, the second server configured to provide functionality to the postal device redundant to functionality provided by the first server;
authenticating the first device certificate using the first server certificate;
authenticating the first server certificate using a root certificate that includes a root server public key corresponding to the root server private key; and
in response to the first device certificate and the certificate of the first server being authenticated, creating a second device certificate and sending the second device certificate to the postal device,
each of the first server and the second server being configured to service said postal device while said postal device is in an operational state,
the first server and the second server configured not to replicate data between the first server and the second server.

11. The method of claim 10, wherein creating the second device certificate comprises signing the public key of the first device certificate using a second server private key.

12. The method of claim 10, wherein creating the second device certificate comprises receiving a second device public key and signing the second device public key using a second server private key.

13. The method of claim 12, further comprising replacing the first device certificate with the second device certificate at the postal device.

14. The method of claim 10, wherein the root server is a first root server, the root server public key is a first root server public key and the root certificate is a first root certificate that further includes a hash of a second root server public key and further comprising:
receiving at the second server the second root server public key;
calculating the hash of the second root server public key;
comparing the calculated hash of the second root server public key to the hash included in the first root server certificate; and
in response to the calculated hash corresponding to the hash included in the first root server certificate, replacing at the second server the first root server certificate with a second root server certificate comprising the second root server public key.

15. The method of claim 10, further comprising:
Determining availability of each of a plurality of servers and designating the most available server as the second server.

16. The method of claim 10, further comprising designating one of a plurality of servers as the second server in response to a determination that another server is unavailable.

17. The method of claim 10, wherein the first server and the second server are redundant servers that are configured to provide the same service to the postal device.

18. A non-transitory computer readable storage medium storing instructions configured to authenticate a postal device having a first device certificate and a first server certificate for a first server, the first device certificate including a device public key and a digital signature thereof based upon a first server private key, the first server certificate having a first public key and a digital signature thereof based upon a root server private key and to perform steps comprising:
receiving from the postal device at a second server the first device certificate and the first server certificate, the second server configured to provide functionality to the postal device redundant to functionality provided by the first server;
authenticating the first device certificate using the first server certificate;
authenticating the first server certificate using a root certificate that includes a root server public key corresponding to the root server private key; and
in response to the first device certificate and the certificate of the first server being authenticated, creating a second device certificate and sending the second device certificate to the postal device,
each of the first server and the second server being configured to service said postal device while said postal device is in an operational state,
the first server and the second server configured not to replicate data between the first server and the second server.

19. The non-transitory computer readable storage medium of claim 18, wherein the instructions are configured to perform the further step of replacing the first device certificate with the second device certificate at the postal device.

20. The non-transitory computer readable storage medium of claim 18, wherein the root server is a first root server, the root server public key is a first root server public key and the root certificate is a first root certificate that further includes a hash of a second root server public key and wherein the instructions are configured to perform further steps comprising:
receiving at the second server the second root server public key;
calculating the hash of the second root server public key;
comparing the calculate hash of the second root server public key to the hash included in the first root server certificate; and
in response to the calculated hash corresponding to the hash included in the first root server certificate, replacing at the second server the first root server certificate with a second root server certificate comprising the second root server public key.

* * * * *